(12) United States Patent
Ha (10) Patent No.: US 7,618,101 B2
(45) Date of Patent: Nov. 17, 2009

(54) BRAKE SYSTEM FOR AUTOMOBILE

(75) Inventor: Tae-Hwan Ha, 11-902, Byucksan Apt., Hakey-dong, Nowon-gu, Seoul (KR)

(73) Assignee: Tae-Hwan Ha, Seoul (KR)

( * ) Notice: Subject to any disclaimer, the term of this patent is extended or adjusted under 35 U.S.C. 154(b) by 0 days.

(21) Appl. No.: 11/601,139

(22) Filed: Nov. 16, 2006

(65) Prior Publication Data

US 2007/0119663 A1    May 31, 2007

Related U.S. Application Data

(63) Continuation of application No. 10/380,075, filed as application No. PCT/KR01/01496 on Sep. 5, 2001, now abandoned.

(51) Int. Cl.
    *F16D 63/00*    (2006.01)
(52) U.S. Cl. .................. 303/151; 192/220; 477/94
(58) Field of Classification Search ............... 303/151; 192/220, 220.1; 477/92, 94, 95, 182
    See application file for complete search history.

(56) References Cited

U.S. PATENT DOCUMENTS

| 4,047,765 A |   | 9/1977  | Ulrich, Jr.            |
|-------------|---|---------|------------------------|
| 4,282,957 A | * | 8/1981  | Sugimoto et al. ...... 192/220 |
| 4,456,108 A |   | 6/1984  | Kageyama               |
| 4,466,519 A |   | 8/1984  | Römer                  |
| 4,617,840 A |   | 10/1986 | Yamakawa et al.        |
| 4,624,154 A |   | 11/1986 | Kraft et al.           |
| 4,708,032 A |   | 11/1987 | Harada et al.          |
| 4,892,360 A |   | 1/1990  | Tysver                 |
| 5,105,923 A | * | 4/1992  | Iizuka ................ 192/220 |
| 5,197,355 A |   | 3/1993  | Sherman et al.         |
| 5,368,137 A |   | 11/1994 | Clemens                |
| 5,758,619 A |   | 6/1998  | Edelmann et al.        |
| 6,315,689 B1|   | 11/2001 | Ha                     |

FOREIGN PATENT DOCUMENTS

| EP | 0040904 A2  |   | 4/1981 |
|----|-------------|---|--------|
| WO | WO 00/40876 | * | 5/1999 |
| WO | WO 02/12010 A1 |   | 2/2002 |

OTHER PUBLICATIONS

PCT, International Preliminary Examination Report for International Application No. PCT/KR01/01496, International Filing Date, Sep. 5, 2001, date of completion of this report, Nov. 22, 2002, pp. 3 total.

* cited by examiner

*Primary Examiner*—Bradley T King
(74) *Attorney, Agent, or Firm*—Blakely, Sokoloff, Taylor & Zafman LLP (57) ABSTRACT

Brake system for automobile is disclosed. The brake system comprises a braking gear for supplying a braking force to an output shaft, a first braking member for making the braking gear stop, an operator for operating the first braking member and a third braking member for selectively making speed change gears stop, and a controller for controlling the operator. The breaking gear meshes continuosly with a driving gear and is coaxially aligned with the output shaft. The first braking member engages the braking gear to connect or disconnect the supply of power from a driving shaft to the braking gear. The controller receives a braking signal generated by a braking treadle and controls the operator to disconnect the supply of power from the driving shaft to the speed change gears and engage the braking gear by an operation of the first braking member.

18 Claims, 6 Drawing Sheets

BRAKE SYSTEM FOR AUTOMOBILE

CROSS-REFERENCE TO OTHER APPLICATIONS

This is a continuation of U.S. patent application Ser. No. 10/380,075, filed on Jul. 7, 2003, now abandoned which claims priority from International Patent Application No. PCT/KR01/01496, filed on Sep. 5, 2001, which claims priority from Korean Patent Application No. 2000/52705, filed on Sept. 6, 2000.

TECHNICAL FIELD

This invention relates to a brake system for automobile, and more particularly, to a brake system which releases an engaged speed change gear when a brake treadle is pressed, and at the same time, applies frictional resistance to an output shaft connected to wheels via a four-wheel drive gear and a braking gear, and thus the frictional resistance produced in the four-wheel drive gear and a braking gear decelerates speed.

BACKGROUND ART

A brake system is a device or mechanism for applying frictional resistance to the motion of a body and thereby absorbing mechanical energy by transferring it into heat. This will slow down a vehicle or make it stop.

If a driver presses a brake treadle, a hydraulic generator generates hydraulic pressure that is supplied to a brake shoe. The brake shoe presses a brake drum or a brake disk by an operation of the hydraulic pressure, and thereby decelerates speed of a vehicle.

However, a vehicle with the conventional brake system decelerates or stops only by an operation of a brake drum or a brake disk attached to a wheel. Therefore, it is unsuitable while running at high speed and its braking performance is low.

In order to avoid the above problems, a driver applies a so-called engine brake technique. That is, a driver rapidly changes a speed level from a high-speed level to a low-speed level to decrease a speed of a vehicle at the high speed.

However, it is difficult for a driver to operate the speed change lever from a high-speed level to a low-speed level during urgent circumstances. Furthermore, a braking performance is low in this case.

DETAILED DESCRIPTION OF THE INVENTION

In view of the prior art described above, including the disadvantages and deficiencies of the prior art, it is an object of the present invention to provide a brake system for an automobile which decreases a rotational speed of an output shaft in advance before an internal expanding brake attached to a wheel is operated.

To accomplish the above-mentioned object, the brake system according to this invention comprises a semiautomatic transmission for changing a speed of a driving shaft and transmitting power of the driving shaft to an output shaft, the semiautomatic transmission comprising a plurality of driving gears fixed on the driving shaft connected to an engine, a plurality of speed chance gears fixed on the output shaft and continuously meshing with the driving gears, and a gear shifting lever connected to the speed change gears, for selecting speed levels; a braking gear fixed on the output shaft and continuously meshing with the driving gear, for applying a braking force to the output shaft; a first braking member for engaging the braking gear to apply frictional resistance to the motion of the braking gear, an operator for operating the first braking member and a plurality of third braking members which selectively engage any one of the speed change gears; and a controller receiving a braking signal generated from a brake treadle and controlling the operator to release the third braking member from the engaged speed change gear and to engage the first braking member to the braking gear.

The braking gear may comprise a sun gear having outer teeth and fixed on the output shaft; a plurality of first planetary gears meshing with the outer teeth of the sun gear; a first ring gear having inner teeth and outer teeth, the inner teeth thereof meshing with the first planetary gears; a plurality of second planetary gears meshing with the outer teeth of the first ring gear; a second ring gear having inner teeth and outer teeth, the inner teeth thereof meshing with the second planetary gears, and the second ring gear continuously meshing with the driving gear; and a carrier rotatably supporting the first and second planetary gears, the rotation of the carrier being controlled by the first braking member The braking gear may comprise a sun gear having outer teeth and fixed on the output shaft; a plurality of first planetary gears meshing with the outer teeth of the sun gear; an idle gear continuously meshing with the driving gear; a ring gear having inner teeth and outer teeth, the inner teeth thereof meshing with the planetary gears, and the outer teeth thereof meshing with the idle gear; a carrier rotatably supporting the planetary gears, the rotation of the carrier being controlled by the first braking member.

The first braking member comprises a supporting member which comprises a pad coming in contact with a periphery of the carrier and a brake shoe supporting the pad, and an operating member connected to the brake shoe and operated by the operator, the operating member making the supporting member grip or release the carrier.

The brake system may further comprise an elastic member placed between the pad and the brake shoe, for applying an elastic force to the pad.

The operator comprises a hydraulic supplier controlled by the controller and generating hydraulic pressure; a first valve for controlling a supply of hydraulic pressure supplied from the hydraulic supplier to the first braking member; and a plurality of third valves for controlling a supply of hydraulic pressure supplied from the hydraulic supplier to each of the third braking members.

The operator may comprise a first solenoid valve electrically operating the first braking member and a third solenoid valve electrically operating the third braking members.

The operator may be operated by hydraulic pressure extracted from a master cylinder that generates hydraulic pressure by an operation of the brake treadle.

The controller may control the operator so that the braking gear brakes intermittently.

The controller may control the operator so that the braking gear brakes only where a speed of a vehicle is over a predetermined speed.

Furthermore, the brake system according to this invention may comprise a semiautomatic transmission for changing a speed of a driving shaft and transmitting power of the driving shaft to a output shaft, the semiautomatic transmission comprising a plurality of driving gears fixed on the driving shaft connected to an engine, a plurality of speed change gears fixed on the output shaft and continuously meshing with the driving gears, a four-wheel drive gear coaxially aligned with the output shaft and transmitting power to both front and rear wheels, and a gear shifting lever connected to the speed change gears, for selecting speed levels; a braking gear fixed on the output shaft and continuously meshing with the driving gear, for applying a braking force to the output shaft; a first braking member for engaging the braking gear to apply frictional resistance to the motion of the braking gear; an operator for operating the first braking member, a second braking member which engages the four-wheel drive gear, and a plurality of third braking members which selectively engage any one of the speed change gears; and a controller receiving a braking signal generated from a brake treadle and controlling the operator to release the third braking member from the engaged speed gear and to engage the first and second braking members to the braking gear and the four-wheel drive gear respectively.

In this case, the operator may comprise a hydraulic supplier controlled by the controller and generating hydraulic pressure; a first valve for a controlling a supply of hydraulic pressure supplied from the hydraulic supplier to the first braking member; a second valve for controlling a supply of hydraulic pressure supplied from the hydraulic supplier to the second braking member; and a plurality of third valves for controlling a supply of hydraulic pressure supplied from the hydraulic supplier to each of the third braking members.

And the operator may comprise a first solenoid valve electrically operating the first braking member, a second solenoid valve electrically operating the second braking member, and a third solenoid valve electrically operating the third braking members.

BEST MODE FOR CARRYING OUT THE INVENTION

Hereinafter, preferred embodiments according to the present invention will be described in detail with reference to the drawings.

Figure 1:
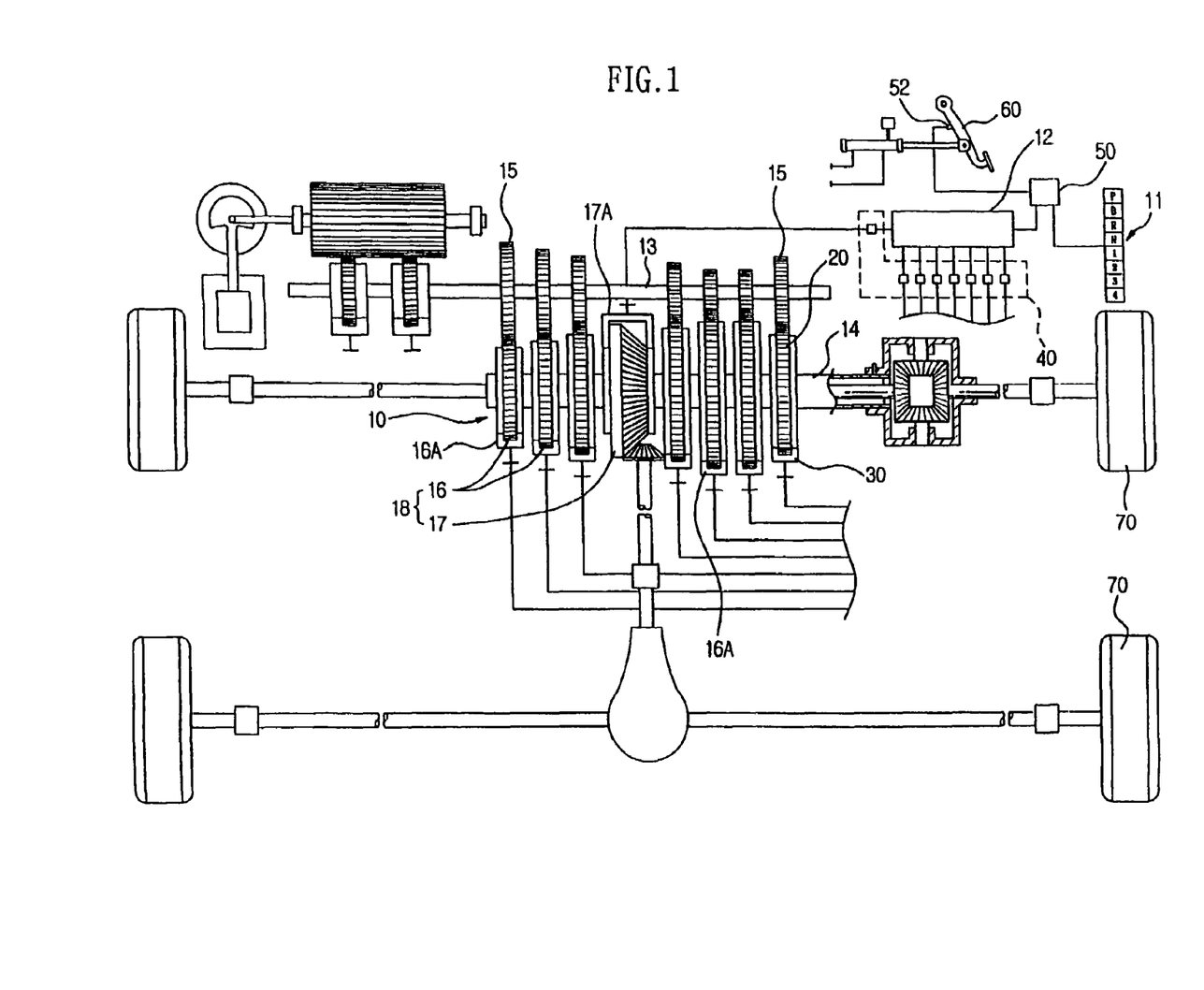
FIG. 1 is a schematic view showing a configuration of a preferred embodiment of the brake system for an automobile according to the present invention.

FIG. 1 is a schematic view showing a configuration of a preferred embodiment of the brake system for an automobile according to the present invention.

As shown in FIG. 1, the brake system according to the present invention comprises a braking gear 20 for applying a braking force to the output shaft 14, a first braking member 30 for engaging the braking gear to apply frictional resistance to the motion of the braking gear 20, an operator 40 for operating the first braking member 30, and a controller 50 receiving a speed signal of a vehicle and a braking signal produced from a brake treadle 60 and then controlling the operator 40.

The brake system according to this invention is applied to a vehicle having a semiautomatic transmission 10 which comprises a gear shifting lever 11 for selecting a speed level and a speed change means 18 for changing a rotational speed of a driving shaft 13 by an operation of a hydraulic supplier 12 and for transmitting the changed power to the output shaft 14.

The speed change means 18 comprises a plurality of forward transmitting gear sets having a different gear ratio respectively and coaxially aligned with the output shaft 14 and a backward transmitting gear set for changing the direction of rotation of wheels. The forward transmitting gear sets and the backward transmitting gear set is continuously meshing with the driving gears 15. Thus, no clutch is required in the semiautomatic transmission 10.

The semiautomatic transmission 10 may further comprise a differential gear part installed at the end of the output shaft 14 for allowing one wheel to turn faster than the other wheel and a four-wheel drive installed at a portion of the output shaft 14 for selectively transmitting power to both front and rear wheels.

The specific configuration of the above-mentioned semiautomatic transmission is disclosed in U.S. Pat. No. 6,315,689 B1 and PCT Application No. PCT/KR01/01353, published as WO 2002/012010 A1.

A vehicle with the semiautomatic transmission 10 has a normal brake system attached to wheels. When a driver operates a brake treadle, a speed change gear is released from a driving gear not to transmit power to the output shaft 14, and then the normal brake system operates to decelerate speed of wheels.

However, the normal brake system can't effectively decelerate a speed of a vehicle with the semiautomatic transmission because the configuration of the above-mentioned semiautomatic transmission is different from that of the conventional transmission.

The brake system according to this invention can effectively stop or slow down a vehicle by a braking operation of the braking gear 20 and the four-wheel drive gear 17 which is operated by the operator 40 controlled by the controller 50.

Hereinafter, elements of the embodiment according to the present invention will be described in detail.

Figure 3:
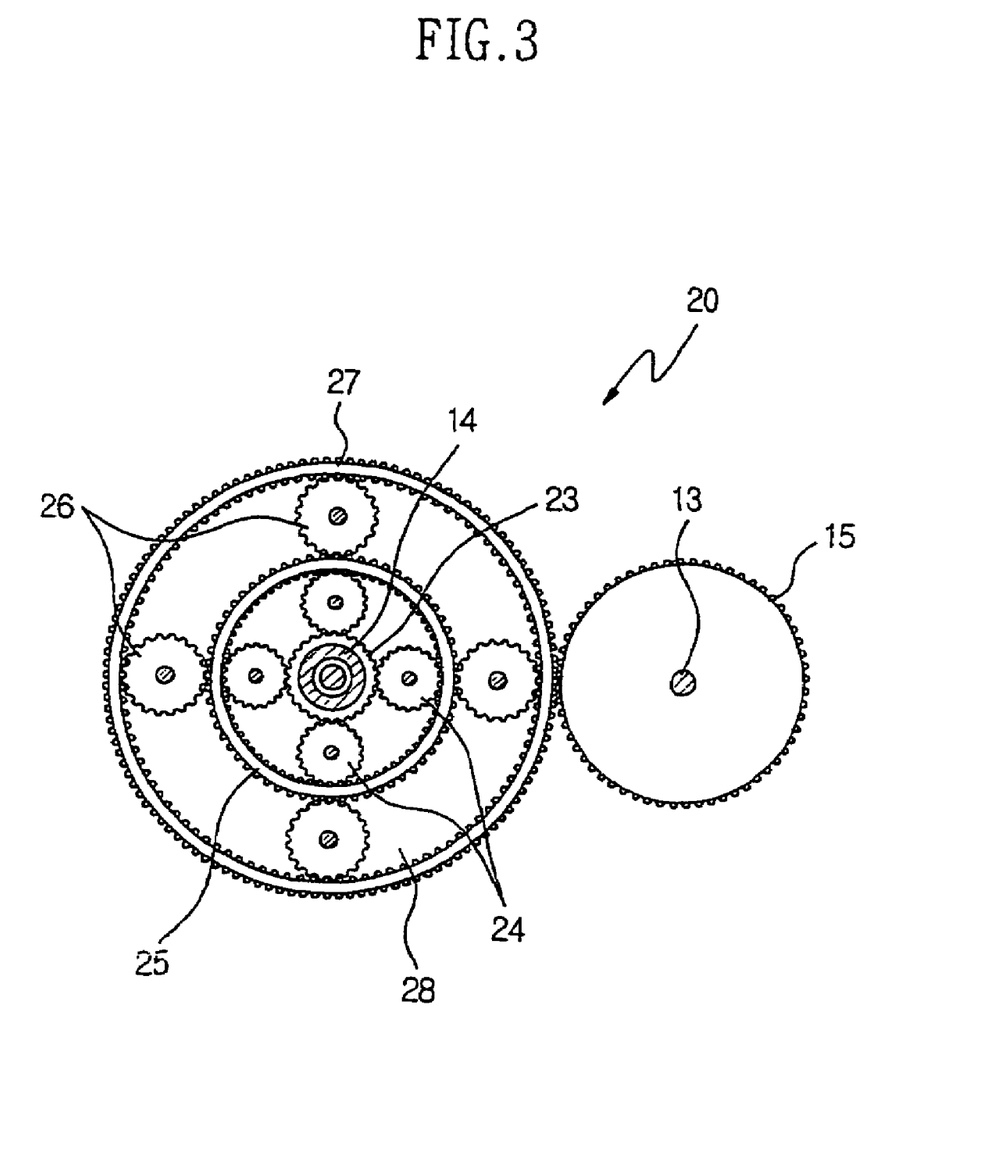
FIG. 3 is a sectional view showing a configuration of a braking gear of the brake system shown in FIG. 1.

FIG. 3 is a sectional view showing a configuration of a braking gear of the brake system shown in FIG. 1.

As shown in FIG. 3, the braking gear 20 is fixed on the output shaft 14 and continuously meshes with the driving gear 15. The braking gear 20 decreases the rotational speed of the output shaft 14.

The braking gear 20 comprises a sun gear 23, a plurality of first planetary gears 24, a first ring gear 25, a plurality of second planetary gears 26, a second ring gear 27, and a carrier 28. The sun gear 23 is fixed on the output shaft 14. The plurality of first planetary gears 24 meshes with an outer teeth of the sun gear 23. The first ring gear 25 has inner teeth and outer teeth and the inner teeth thereof mesh with the first planetary gears 24. The second planetary gears 26 mesh with the outer teeth of the first ring gear 25. The second ring gear 27 has inner teeth and outer teeth. The inner teeth of the second ring gear 27 mesh with the second planetary gears 26 and the outer teeth of the second ring gear 27 continuously mesh with the driving gear 15. The carrier 28 rotatably supports the first and second planetary gears 24, 26. Whether the carrier 28 rotates or not is controlled by the first braking member 30.

The braking gear 20 produces a braking force to reverse a rotation of the driving gear 15 by means of an operation of the first braking member 30. Thus, a vehicle decelerates.

The braking gear 20 may comprise a sun gear having outer teeth and fixed on the output shaft, a plurality of first planetary gears meshing with the outer teeth of the sun gear, an idle gear continuously meshing with the driving gear, a ring gear having inner teeth and outer teeth, and a carrier rotatably supporting the planetary gears (not shown).

The inner teeth of the ring gear mesh with the planetary gears, and the outer teeth of the ring gear mesh with the idle gear. Whether the carrier rotates or not is controlled by the first braking member.

The configuration of the braking gear 20 can be changed if it produces a braking force to reverse a rotation of the driving gear 15.

Figures 4A, 4B:
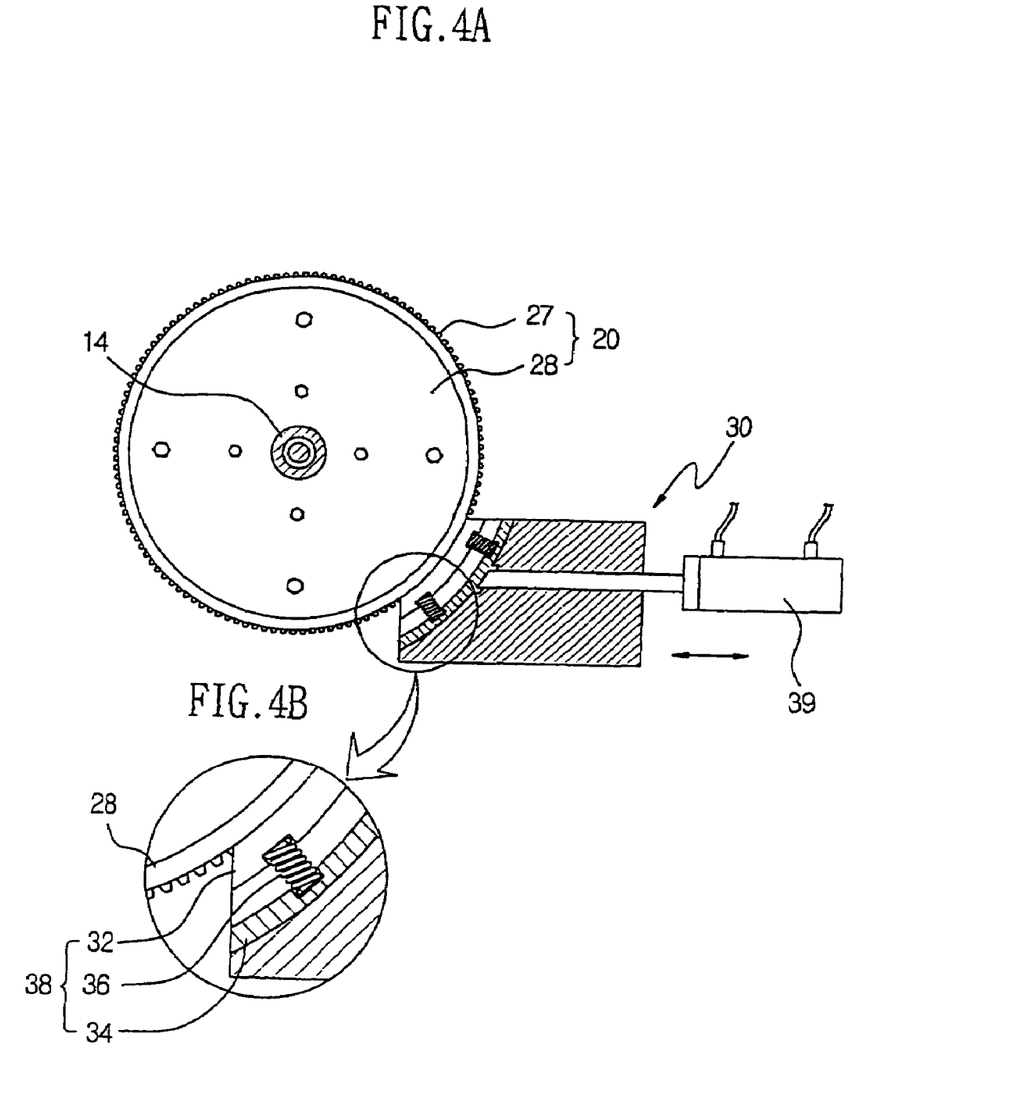
FIG. 4A is a sectional view showing a configuration of a first braking member of the brake system in FIG. 1.
FIG. 4B is a partially enlarged sectional view showing the first braking member shown in FIG. 4A.

FIG. 4A is a sectional view showing a configuration of a first braking member of the brake system in FIG. 1, and FIG. 4B is a partially enlarged sectional view showing the first braking member shown in FIG. 4A.

The first braking member 30, as shown in FIGS. 4A and 4B, engages or releases the braking gear 20 in order to connect or disconnecting the driving shaft 13 to the output shaft 14. The first braking member 30 comprises a supporting member 38 and an operating member 39. The supporting member 38 comprises a pad 32 that comes in contact with a periphery of the carrier 28 and a brake shoe 34 that supports the pad 32. The supporting member 38 may further comprise an elastic member 36 placed between the pad 32 and the brake shoe 34 to apply an elastic force to the pad 32. A portion of the operating member 39 is connected to the brake shoe 34 and the other portion of the operating member 39 is connected to the operator 40. The operating member 39 moves backward and forward by an operation of the operator 40 and makes the supporting member 38 grip or release the carrier 28.

In the meanwhile, the configuration of the third braking members 16A is similar to that of the first braking member 30. The third braking member 16A is designed to be controlled by the operator 40.

The four-wheel drive gear 17 transmits engine power to both front and rear wheels. The four-wheel drive gear 17 is controller by a second braking member 17A. The configuration of the second braking members 17A is similar to that of the first braking member 30 as well. The second braking member 17A is designed to be controlled by the operator 40 as well.

Figure 2:
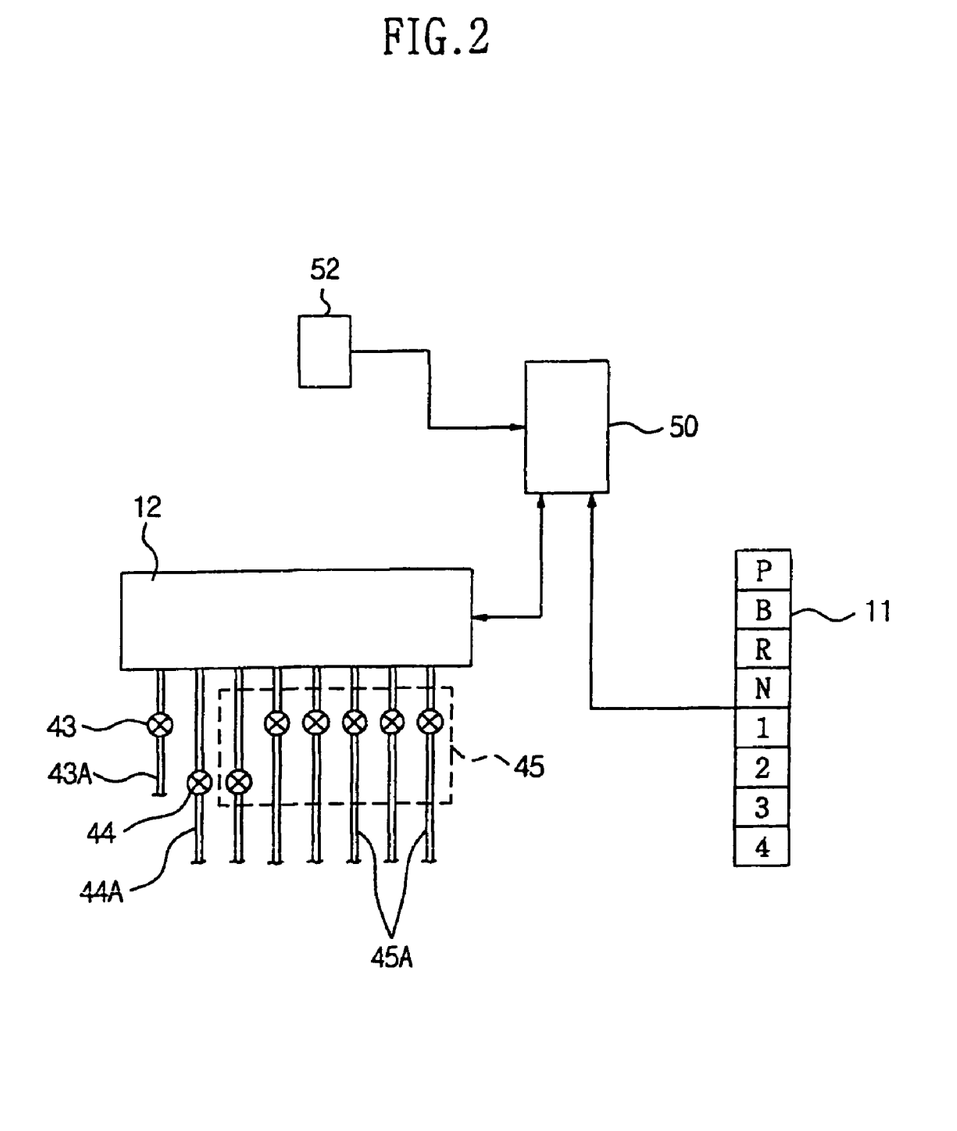
FIG. 2 is a schematic view showing an operator of the brake system shown in FIG. 1.
Figure 5:
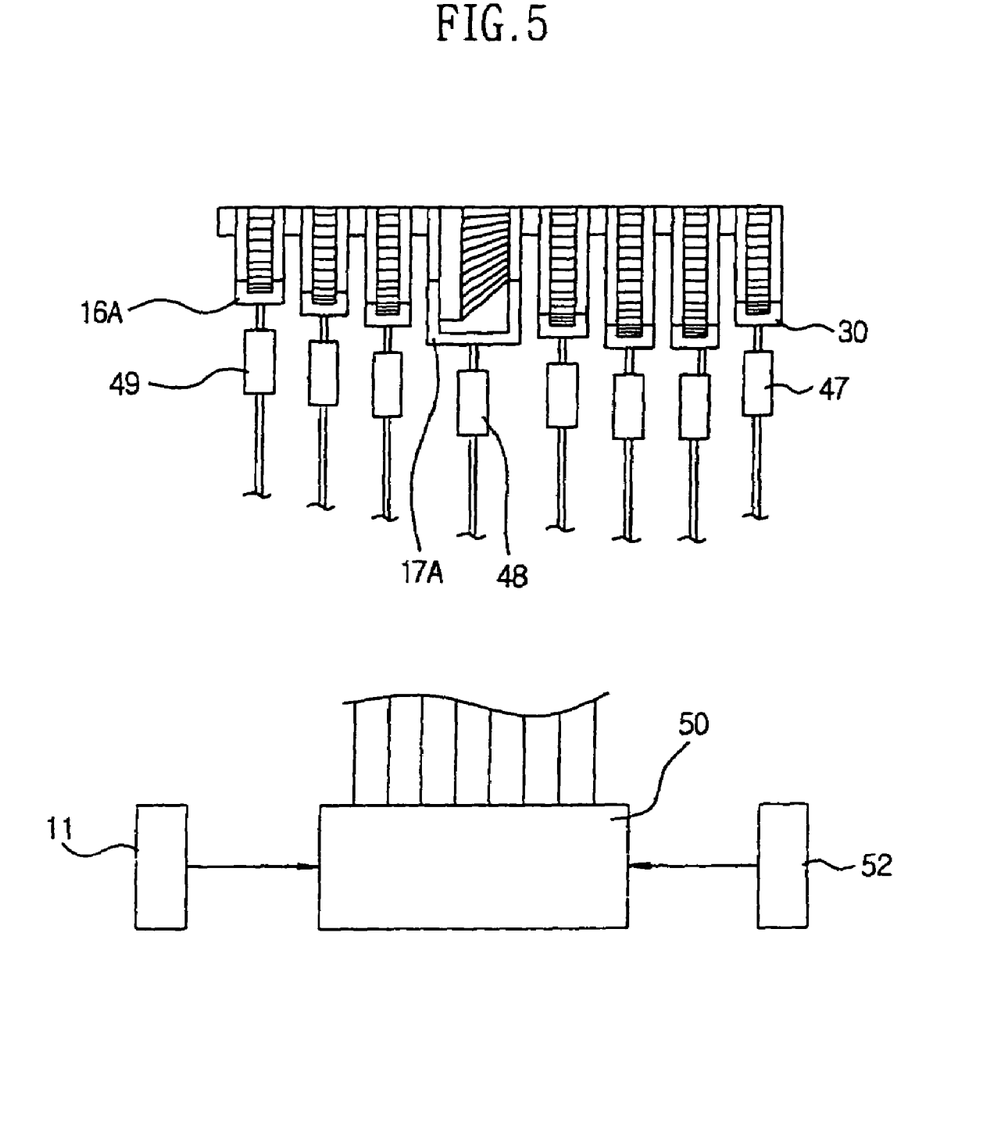
FIG. 5 is a schematic view showing a configuration of another embodiment of an operator of the brake system according to the present invention.
Figure 6:
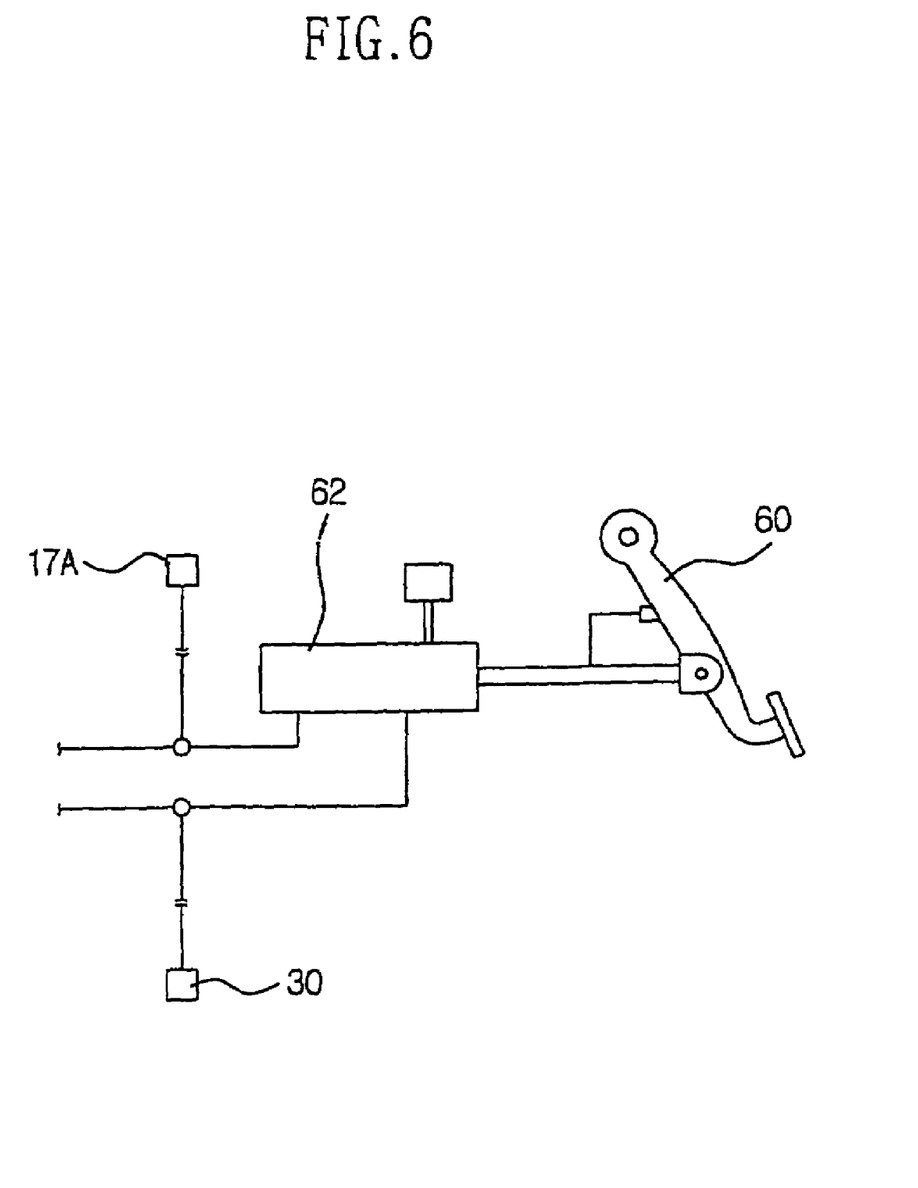
FIG. 6 is a schematic view showing a configuration of a further embodiment of an operator of the brake system according to the present invention.

FIG. 2 is a schematic view showing an operator of the brake system shown in FIG. 1, FIG. 5 is a schematic view showing a configuration of another embodiment of an operator of the brake system according to the present invention, and FIG. 6 is a schematic view showing a configuration of a further embodiment of an operator of the brake system according to the present invention.

The operator 40 operates the first braking member 30, the third braking member 16A, and the second braking member 17A while being controlled by the controller 50.

As shown in FIGS. 1 and 2, the operator 40 comprises a hydraulic supplier 12 which is controlled by the controller and produces hydraulic pressure, a first valve 43 which controls a supply of hydraulic pressure supplied from the hydraulic supplier 12 to the first braking member 30, a second valve 44 which controls a supply of hydraulic pressure supplied from the hydraulic supplier 12 to the second braking member 17A, and a plurality of third valves 45 which control a supply of hydraulic pressure supplied from the hydraulic supplier 12 to each of the third braking members 16A.

The first valve 43 is fitted in a first supplying pipe 43A which connects the hydraulic supplier 12 to the first braking member 30. The second and third valve 44, 45 are fitted in a second and third supplying pipe 44A, 45A which connect the hydraulic supplier 12 to the second and third braking member 17A, 16A respectively.

The valves may be solenoid valves that are electrically operated. That is, the operator 40, as shown in FIG. 5, may comprise a first solenoid valve 47 which electrically operates the first braking member 30, a second solenoid valve 48 which electrically operates the second braking member 17A, and a plurality of third solenoid valves 49 which electrically operates the third braking members 16A. The solenoid valves 47, 48, 49 are operated by electricity supplied from an external power source.

The solenoid valves 47, 48, 49 are replaced by some devices, for example a step motor, which can operate as stated above.

As shown in FIG. 6, the operator 40 may be operated by hydraulic pressure extracted from a master cylinder that produces hydraulic pressure by an operation of the brake treadle 60.

The controller 50 controls the operator 40. When a driver presses the brake treadle 60, a sensor 52 senses a signal produced from the brake treadle 60 and transmits it to the controller 50. Then the controller 50 receives the signal and releases the engaged speed change gear 16. Thus, the power from the driving shaft 13 isn't transmitted to the output shaft 14.

That is, the controller 50 controls the third braking member 16A to release the carrier of the speed change gear 16. Then the first braking member 30 and the second braking member 17A engage the carrier 28 of the braking gear 20 and the carrier of the four-wheel drive gear 17 respectively to apply braking force to the wheels.

The braking force is produced by friction force between the carrier 28 of the braking gear 20 and the first braking member 30.

The controller 50 may control the operator 40 to engage the braking gear 20 intermittently.

The controller 50 may control the operator 40 to engage the braking gear 20 and the four-wheel drive gear 17 only when a speed of a vehicle is over a predetermined speed, for example 100 km/h. The controller 50 receives speed information from a speed meter of a vehicle or directly senses speed of wheels.

The controller 50 may control the brake system so that a vehicle goes slowly forward or stops. Furthermore, the controller 50 may control the hydraulic supplier 12 which operates the speed change gear 16 and the four-wheel drive gear 17 to transmit power to the output shaft 14 and rear wheels respectively.

The controller 50 may control the operator 40 not to transmit power through the speed change gear 16 and the four-wheel drive gear 17 if the brake system according to the present invention operates.

The sensor 52 senses a speed of a vehicle and transmits it to the controller 50. The controller 50 can control the brake system effectively by a speed signal transmitted from the sensor 52.

The sensor 52 may be a limit switch, a variable resistance switch, an optical sensor, an ultrasonic sensor, etc.

The brake system described above is operated as follows.

As shown in FIG. 1, if a driver presses the brake treadle 60 while driving, the controller 50 receives a speed signal and a brake signal. If the speed of a vehicle is over the predetermined speed, the brake system according to this present invention operates.

That is, if a driver puts a vehicle into gear to move, the third brake member 16A engages a carrier of the speed change gears 16. Then a power of the driving shaft 13 is transmitted to the output shaft 14 via a ring gear, planetary pinions, and sun gear, and then wheels of the vehicle rotate.

If a driver presses the brake treadle 60 while driving, the sensor 52 senses the brake signal and transmits it to the controller 50. The controller 50 receives a speed signal of the vehicle and the brake signal transmitted from the sensor 52.

Then the controller 50 compares the speed of the vehicle with the predetermined speed. If the speed of the vehicle is higher than the predetermined speed (ex. 100 km/h), the controller 50 controls the operator 40 to operate the first, second and third braking member 30, 17A, 16A. That is, the controller 50 males the hydraulic supplier 12 produce hydraulic pressure. The hydraulic pressure is supplied to the third supplying pipe 45A which is connected to the third braking member 16A of the speed change gear 16. Thus the third braking member 16A releases a carrier of the speed change gear 16. If the carrier of the speed change gear 16 is released, the power of the driving shaft 13 isn't transmitted to the output shaft 14.

And then the first valve 43 fitted in the supplying pipe 43A opens and hydraulic pressure operates the first braking member 30. Simultaneously, the second valve 44 fitted in the supplying pipe 44A opens and hydraulic pressure operates the second braking member 17A.

That is, the speed change gear 16 is released and the four-wheel drive gear 17 and the braking gear 20 are engaged. If the four-wheel drive gear 17 is already engaged, it is not necessary to engage the four-wheel drive gear 17. The brake system may have a sensor that senses whether the four-wheel drive gear 17 is engaged or not.

If the controller 50 controls the operator 40 as stated above, the braking gear 20 produces frictional resistance which slows down the rotational speed of the output shaft 14 because the braking gear 20 has a set of planetary gears as shown in FIG. 2. That is, in this case, if the first braking member 30 engages the carrier 28, the first and second planetary gears 24, 26 don't revolve around the sun gear 23 any longer. The first and second planetary gears 24, 26 rotate on theirs own axis. Therefore, the frictional resistance is transmitted to the output shaft 14, and thus the speed of a vehicle is reduced.

In this case, the controller 50 may control the operator 40 so that there is a small amount of slip between the first braking member 30 and the carrier 28. That is, there is insufficient frictional grip between the first braking member 30 and the carrier 28. The elastic member 36 between the pad 32 and the brake shoe 34 provides suitable frictional force to grip the carrier 28. The frictional force between the first braking member 30 and the carrier 28 reduces the rotational speed of the output shaft 14 and thus the speed of a vehicle gradually becomes slower. That is, the braking force is produced by friction between the first braking member 30 and the carrier 28 of the braking gear 20.

In this case, the controller 50 may control the normal brake system attached to wheels so that it does not operate while the brake system according to this present invention operates. Furthermore, if a speed of a vehicle is below a predetermined speed, for example, 70 km/h, the controller 50 may control the operator 40 so that the normal brake system operates.

That is, if a speed of a vehicle gradually becomes slower and is below a predetermined speed, the controller 50 controls the operator 40 so that the pad 32 is released from the carrier 28, and then the second braking member 17A is released from the four-wheel drive gear 17. And then the controller 50 operates the normal brake system attached to wheels to stop the vehicle.

A speed of a vehicle is effectively reduced by an operation of the brake system according to this present invention provided in the semiautomatic transmission 10, especially at the high speed.

In the meanwhile, the controller 50 may control the brake system only when a speed of a vehicle is over the predetermined speed. That is, if a speed of a vehicle is over the predetermined speed, the controller 50 operates the brake system, and if a speed of a vehicle is below the predetermined speed, the controller 50 does not operate the brake system. In this case, the vehicle decelerates by an operation of the normal brake system attached to wheels.

Hereinafter, an operation of the operator according to another embodiment is described.

As shown in FIG. 5, the operator 40 according to another embodiment comprises a first, second and third solenoid valve 47, 48, 49 which electrically operates the first braking member 30, the second braking member 17A and the third braking member 16A respectively.

The solenoid valves 47, 48, 49 can provide an operational force intermittently, and thus they can transmit braking force to wheel 70 intermittently. Therefore, the brake system can be automatically controlled by an operation of the solenoid valves 47, 48, 49.

The solenoid valve 47 makes the first braking member 30 move back and forth intermittently, for example, 24 times per second, and thus the first braking member 30 grips the carrier 28 of the braking gear 20 intermittently. Therefore, the braking force is applied to the output shaft 14 intermittently via the output shaft 14 and the four-wheel rive gear 17, and thus the rotational speed of the wheels 70 slows down effectively.

A driver can steer effectively even though he rapidly decreases speed in a short time because the braking force is transmitted to the wheels intermittently.

Hereinafter, an operation of the operator according to a further embodiment is described.

As shown in FIG. 6, if a driver presses the brake treadle 60 to slow down, the second braking member 17A and the first braking member 30 grip the four-wheel drive gear 17 and the braking gear 20 respectively by hydraulic pressure extracted from a master cylinder which produces hydraulic pressure by an operation of the brake treadle. In this case, the controller 50 cuts off the supply of hydraulic pressure to the third braking member 16A gripping any one of the speed change gears 16. The configuration of the brake system with this operator 40 is simple and compact because the operator 40 operates by hydraulic pressure extracted from the master cylinder.

As described above, if a driver presses the brake treadle 60 while driving, the controller 50 controls the operator 40 to release the speed change gear 16 and to engage the braking gear 20 and the four-wheel drive gear 17, and thus decrease speed.

The brake system according to this invention is suitable for the vehicle with the semiautomatic transmission 10 having a plurality of speed change gears 16 that are fixed on the output shaft 14 and continuously mesh with the driving gears 13.

The brake system according to this present invention can decrease speed even though a normal brake system attached to wheels breaks down because it operates independently of each other.

A driver can control a vehicle effectively at the high speed because the brake system according to this present invention operates before the normal brake system attached to wheels operates to decrease speed.

Furthermore, a driver can control a speed of a vehicle at the optimum condition because the operator controlled by the controller operates the braking gear, the four-wheel drive gear, and the speed change gear according to a speed and other conditions of a vehicle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. A brake system for automobile comprising:
   a semiautomatic transmission for changing a speed of a driving shaft and transmitting power from the driving shaft to an output shaft, the semiautomatic transmission comprising a plurality of driving gears fixed on the driving shaft connected to an engine, a plurality of speed change gears fixed on the output shaft and continuously meshing with the driving gears, and a gear shifting lever connected to the speed change gears, for selecting speed levels;
   a braking gear fixed on the output shaft and continuously meshing with the driving gear, for applying a braking force to the output shaft;
   a first braking member for engaging the braking gear to apply frictional resistance to the motion of the braking gear;
   an operator for operating the first braking member and a plurality of third braking members which selectively engage any one of the speed change gears; and
   a controller receiving a braking signal produced from a brake treadle and controlling the operator to release at least one of the plurality of third braking members from the engaged speed change gear and to engage the first braking member to the braking gear and to engage a four-wheel drive gear.

2. The brake system for automobile according to claim 1, wherein the braking gear comprises
   a sun gear having outer teeth and fixed on the output shaft;
   a plurality of first planetary gears meshing with the outer teeth of the sun gear;
   a first ring gear having inner teeth and outer teeth, the inner teeth thereof meshing with the first planetary gears;
   a plurality of second planetary gears meshing with the outer teeth of the first ring gear;
   a second ring gear having inner teeth and outer teeth, the inner teeth thereof meshing with the second planetary gears, and the second ring gear continuously meshing with the driving gear; and
   a carrier rotatably supporting the first and second planetary gears, the rotation of the carrier being controlled by the first braking member.

3. The brake system for automobile according to claim 2, wherein the first braking member comprises a supporting member which comprises a pad coming in contact with a periphery of the carrier and a brake shoe supporting the pad, and an operating member connected to the brake shoe and operated by the operator, the operating member making the supporting member grip or release the carrier.

4. The brake system for automobile according to claim 3, further comprising an elastic member placed between the pad and the brake shoe, for applying an elastic force to the pad.

5. The brake system for automobile according to claim 1, wherein the operator comprises
   a hydraulic supplier controlled by the controller and generating hydraulic pressure;
   a first valve for controlling a supply of hydraulic pressure supplied from the hydraulic supplier to the first braking member; and
   a plurality of third valves for controlling a supply of hydraulic pressure supplied from the hydraulic supplier to each of the third braking members.

6. The brake system for automobile according to claim 1, wherein the operator comprises a first solenoid valve electrically operating the first braking member and a third solenoid valve electrically operating one of the plurality of third braking members.

7. The brake system for automobile according to claim 1, wherein the operator is operated by hydraulic pressure extracted from a master cylinder which produces hydraulic pressure by an operation of the brake treadle.

8. The brake system for automobile according to claim 1, wherein the controller controls the operator to engage the braking gear intermittently.

9. The brake system for automobile according to claim 1, wherein the controller controls the operator to engage the braking gear only when a speed of a vehicle is over a predetermined speed.

10. A brake system for automobile comprising:
    a semiautomatic transmission for changing a speed of a driving shaft and transmitting power of the driving shaft to an output shaft, the semiautomatic transmission comprising a plurality of driving gears fixed on the driving shaft connected to an engine, a plurality of speed change gears fixed on the output shaft and continuously meshing with the driving gears, a four-wheel drive gear coaxially aligned with the output shaft and transmitting power to both front and rear wheels, and a gear shifting lever connected to the speed change gears, for selecting speed levels;
    a braking gear fixed on the output shaft and continuously meshing with the driving gear, for applying a braking force to the output shaft;
    a first braking member for engaging the braking gear to apply frictional resistance to the motion of the braking gear;
    an operator for operating the first braking member, a second braking member which engages the four-wheel drive gear, and a plurality of third braking members which selectively engage any one of the speed change gears; and
    a controller receiving a braking signal produced from a brake treadle and controlling the operator to release at least one of the plurality of third braking members from the engaged speed change gear and to engage the first and second braking members to the braking gear and the four-wheel drive gear respectively.

11. The brake system for automobile according to claim 10, wherein the braking gear comprises
    a sun gear having outer teeth and fixed on the output shaft;
    a plurality of first planetary gears meshing with the outer surface of the sun gear;
    a first ring gear having inner teeth and outer teeth, the inner teeth thereof meshing with the first planetary gears;
    a plurality of second planetary gears meshing with the outer teeth of the first ring gear;
    a second ring gear having inner teeth and outer teeth, the inner teeth thereof meshing with the second planetary gears, and the second ring gear continuously meshing with the driving gear; and
    a carrier rotatably supporting the first and second planetary gears, the rotation of the carrier being controlled by the first braking member.

12. The brake system for automobile according to claim 11, wherein the first braking member comprises a supporting member which comprises a pad coming in contact with a periphery of the carrier and a brake shoe supporting the pad, and an operating member connected to the brake shoe and operated by the operator, the operating member making the supporting member grip or release the carrier.

13. The brake system for automobile according to claim 12, further comprising an elastic member placed between the pad and the brake shoe, for applying an elastic force to the pad.

14. The brake system for automobile according to claim 10, wherein the operator comprises
- a hydraulic supplier controlled by the controller and generating hydraulic pressure;
- a first valve for controlling a supply of hydraulic pressure supplied from the hydraulic supplier to the first braking member;
- a second valve for controlling a supply of hydraulic pressure supplied from the hydraulic supplier to the second braking member; and
- a plurality of third valves for controlling a supply of hydraulic pressure supplied from the hydraulic supplier to each of the third braking members.

15. The brake system for automobile according to claim 10, wherein the operator comprises a first solenoid valve electrically operating the first braking member, a second solenoid valve electrically operating the second braking member, and a third solenoid valve electrically operating one of the plurality of third braking members.

16. The brake system for automobile according to claim 10, wherein the operator is operated by hydraulic pressure extracted from a master cylinder which produces hydraulic pressure by an operation of the brake treadle.

17. The brake system for automobile according to claim 10, wherein the controller controls the operator to engage the braking gear intermittently.

18. The brake system for automobile according to claim 10, wherein the controller controls the operator to engage the braking gear only when a speed of a vehicle is over a predetermined speed.

\* \* \* \* \*